Figure 1:
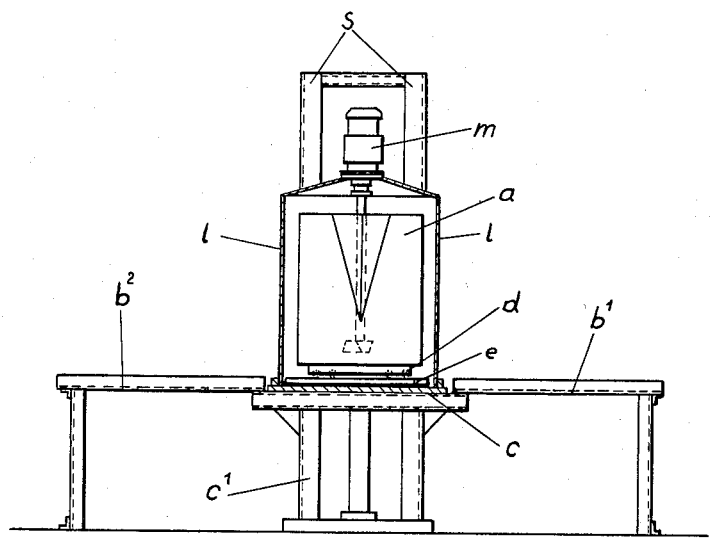

July 23, 1963

H. ROSSMANN 3,098,640

VACUUM GYPSUM MIXERS

Filed Aug. 26, 1960

2 Sheets-Sheet 1

Inventor
HELMUT ROSSMAN
By Kenyon, Palmer, Stewart + Estabrook
Attorneys

3,098,640
VACUUM GYPSUM MIXERS
Helmut Rossmann, Selb, Bavaria, Germany, assignor to Gebrüder Netsch, Maschinenfabrik, Selb, Bavaria, Germany
Filed Aug. 26, 1960, Ser. No. 52,071
7 Claims. (Cl. 259—122)

The invention relates to a vacuum gypsum mixer comprising a vacuum tank for accommodating the mixing vessel which tank is provided with devices for stirring and evacuating the gypsum paste.

In the known gypsum mixers of this type the vacuum tank containing the mixing vessel can be closed by a lid carrying the stirring mechanism. This is open to the objection that the mixing vessel with its contents is introduced into the vacuum tank from above and must again be removed from above. In view of the weight of the filled mixing vessel this is rather troublesome. Another disadvantage is that the gasket ring between the vessel and the lid wears out quickly, yet an absolutely tight packing is essential for evacuating the air from the interior of the tank.

According to another suggestion, a false bottom is fitted in a two-part vacuum tank for carrying the mixing vessel, whereby the false bottom is capable of shifting in relation to one of the parts of the vacuum tank to enable the bottom of the mixing vessel to be brought out of its operative position in the vacuum tank at least to the height of the joint of the vacuum tank. Also in this case the gasket ring which has to seal the upper part on the lower part of the tank becomes useless after only a relatively short period of time. It is also difficult to fit this gasket ring sufficiently tightly on the iron shell of the particular part of the vacuum tank. In addition, the up and down movement of the lower part of the tank requires a lifting device which is by no means simple.

The object of the invention is to produce a vacuum gypsum mixer which ensures perfect sealing of the vacuum tank during a long period of use. In addition vertical movement of the mixing vessel is to be avoided so that it will always be in the same working position. Finally the aim is to facilitate the introduction of the mixing vessel into the vacuum tank and its removal therefrom.

The vacuum gypsum mixer according to the invention is characterized by a carrier plate arranged between run-in and run-out tracks, which plate carries the mixing vessel and on it a hood is hermetically seated as vacuum tank. This carrier plate is, according to another feature of the invention, provided with sheet-like covering coating of some suitable sealing substance such as rubber. The construction of the coating is preferably such that it consists of a lower layer of hard rubber and an upper layer of soft rubber.

The carrier plate is not only arranged between the run-in and run-out tracks but also at the height of both these tracks and is provided with guide members for the mixing vessel which conforms to the guide members of the run-in and run-out tracks. Rails are preferably used as guide members. It is advisable to provide the mixing vessel with rollers of which four pairs are mounted on the underside of the vessel so that there are always two pairs of rollers on the rails of the carrier plate while the mixing vessel is being run in and out, while the two other pairs of rollers are still or already running on the connection rails of the run-in and run-out tracks.

The invention presents a number of important advantages. The above-mentioned raising and lowering of the carrier of the mixing vessel is dispensed with. This vessel retains its operative position right up to the end of the evacuating and stirring operation. It can be brought into its operative position and removed therefrom on the same travelling plane. As a result its manipulation is simple and can be carried out quickly. This is important also because the setting time of gypsum is short so that the mixing vessel must be brought quickly to the place where it is required.

A particular advantage lies in the fact that as sealing surface for the vacuum hood not merely an annular surface but a circular area is available. Consequently no particular care need be exercised when placing the vacuum hood on the carrier plate. The sealing coating is only slightly stressed during the placing and removal of the vacuum hood and therefore it has a longer life. Frictional stresses, such as occur in the case of interengaging tank parts, are eliminated.

Further advantages and features of the invention will become apparent from the following description of the accompanying drawings which show diagrammatically one embodiment of the invention by way of example.

Figure 2:
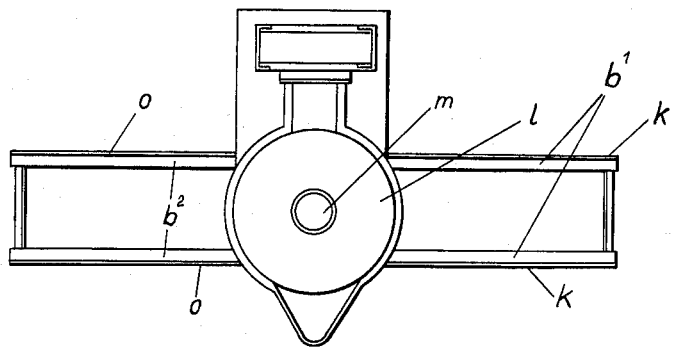
Figure 3:
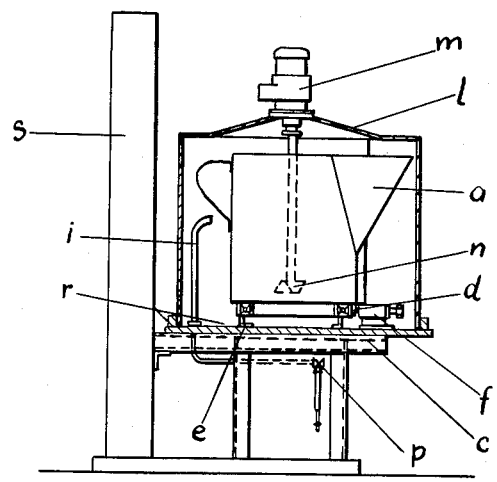
Figure 4:
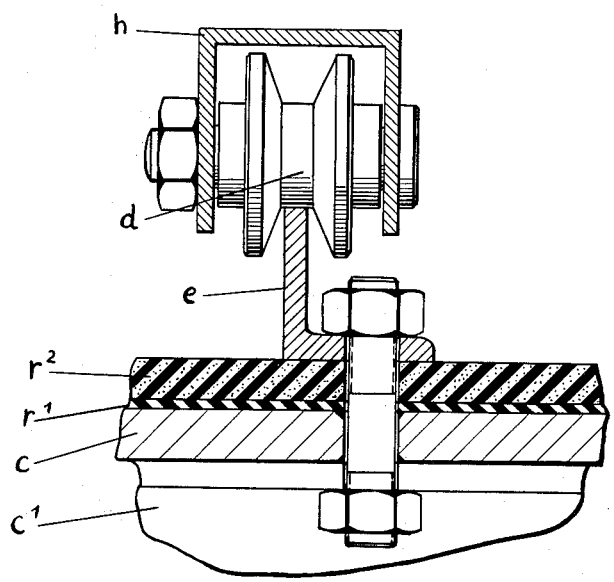

FIG. 1 being an elevation of the vacuum gypsum mixer with section through the vacuum hood and carrier plate;

FIG. 2 is a top plan view of FIG. 1;

FIG. 3 a side elevation with section through the vacuum hood and carrier plate, and FIG. 4 a section on a larger scale through a detail.

Between a run-in track $b^1$ and a run-out track $b^2$ a carrier plate $c$ is arranged which rests on a stand $c^1$ and is completely covered with a sealing or packing coating $r$. This coating $r$ is preferably composed of two layers as shown in FIG. 4, namely a lower harder layer $r^1$ for example of hard rubber and an upper softer layer $r^2$ for example of soft rubber.

The carrier plate $c$ serves for supporting the mixing vessel $a$ and also the vacuum hood $l$. This latter can be raised and lowered by a lifting device which in the drawing is indicated by two guide columns $s$.

Stirring mechanism consisting of an agitator vane $n$ and a driving motor $m$ is mounted on the vacuum hood $l$. The hood together with the mixing vessel is exhausted through a pipe $i$ connected up with a vacuum pump through the intermediary of a valve $p$.

Special guiding members may be provided on the run-in track $b^1$ and run-out track $b^2$ as well as on the carrier plate $c$. In the example illustrated the run-in track is provided with rails $k$ and the run-out track with similar rails $o$. The carrier plate $c$ has rails $e$ at the same distance apart and at the same height as the rails $k$ and $o$. The mixing vessel $a$ is equipped with rollers $d$ which are fitted on the underside of the vessel by means of bearing caps $h$.

As already mentioned it is advisable to arrange these rollers in such a manner that when the vessel is being run in and out there are always two pairs of rollers already or still on the rails of the carrier plate while the two other pairs are still or already on the connecting rails of the run-in and run-out tracks respectively. In this manner vibrationless passage of the mixing vessel from the run-in track onto the carrier plate and from this plate on to the run-out track is ensured.

An abutment $f$ may be provided on the carrier plate $c$ which as the mixing vessel $a$ is run in, fixes the vessel in its working position.

When the vacuum hood has been lowered on to the carrier plate the air is sucked out of this hood. As soon as the prescribed vacuum is established, the motor $m$ is switched on and the agitator vane $n$ set in rotation for performing the mixing operation. When this is finished, the vacuum hood can be refilled with air, or relieved, by opening the cock or valve $p$, after which the hood can easily be removed.

I claim:
1. Vacuum gypsum mixer, comprising a two-part vacuum tank, a flat carrier plate forming the bottom part of said tank, means mounting said carrier plate in fixed position below the upper part of the tank, a run-in track and a run-out track leading to and from said carrier plate respectively on opposite sides thereof, a mixing vessel supported on said plate during mixing operation and being shiftable on to said plate from said run-in track and off said plate onto said run-out track after the mixing operation, a hood forming the top part of said tank adapted to be lowered on to said carrier plate over said mixing vessel in its operative position on said plate and to be raised to withdraw said vessel from said plate, a stirring mechanism carried by said hood and adapted to be lowered into and removed from said mixing vessel during the lowering and raising of said hood, and a vacuum producing and relieving device communicating with the interior of said hood for producing a vacuum therein during the mixing operation and relieving the vacuum at the end of the mixing operation to enable the raising of said hood and the removal of the mixing vessel.

2. Vacuum gypsum mixer as set forth in claim 1, wherein the carrier plate is completely covered on its upper side with a coating of sealing material.

3. Vacuum gypsum mixer as set forth in claim 2, wherein the coating consists of a harder under layer such as hard rubber and a softer upper layer such as soft rubber.

4. Vacuum gypsum mixer as set forth in claim 1, wherein the carrier plate is provided with guide members corresponding in arrangement and spacing with guide members of the run-in and run-out tracks and wherein the mixing vessel is equipped with counter-guide elements cooperating with the guide members of the tracks and the carrier plate.

5. Vacuum gypsum mixer as set forth in claim 4, wherein the guide members of the tracks and carrier plate consist of rails and the counter-guide elements on the mixing vessel consist of rollers running on said rails.

6. Vacuum gypsum mixer as set forth in claim 5, wherein four pairs of rollers are provided on the underside of said mixing vessel and arranged in such a manner that during the running in and out of the mixing vessel two pairs of rollers are always on the carrier plate while the other two pairs of rollers are on one of the tracks leading to and from the carrier plate.

7. Vacuum gypsum mixer as set forth in claim 1, wherein the stirring device carried by the hood comprises an agitator vane projecting into the interior of the hood and a motor arranged on the outer side of the hood.

References Cited in the file of this patent

UNITED STATES PATENTS

| | | |
|---|---|---|
| 1,017,868 | Greene et al. | Feb. 20, 1912 |
| 1,630,012 | Hutchinson | May 24, 1927 |

FOREIGN PATENTS

| | | |
|---|---|---|
| 1,008,176 | Germany | May 9, 1957 |